United States Patent [19]
Boyer

[11] 3,711,647
[45] Jan. 16, 1973

[54] CIRCUIT FOR INTERCONNECTION OF TELEPHONE AND RADIO-TELEPHONE NETWORKS

[75] Inventor: Marcel-Louis Boyer, Chatillon, France

[73] Assignee: C. I. T.-Compagnie Industrielle Des Telecommunications, Paris, France

[22] Filed: Dec. 22, 1970

[21] Appl. No.: 100,648

[30] Foreign Application Priority Data

Dec. 23, 1969 France ................................6944622

[52] U.S. Cl.................179/2 E, 179/1 VC, 179/170.8
[51] Int. Cl...........................H04b 3/20, H04m 11/00
[58] Field of Search.179/2 E, 15 AV, 15 BZ, 15 BW, 179/170.2, 170.4, 170.8, 1 VC; 325/21; 343/179

[56] References Cited

UNITED STATES PATENTS

| | | | |
|---|---|---|---|
| 3,321,581 | 5/1967 | Zryd et al. | 179/1 VC |
| 3,603,744 | 9/1971 | Krasin | 179/170.8 |
| 3,169,221 | 2/1965 | Franchi | 179/170.8 X |
| 2,964,598 | 12/1960 | Parker | 179/170.2 |
| 2,496,186 | 1/1950 | Walter | 179/170.8 |

*Primary Examiner*—Donald J. Yusko
*Attorney*—Craig, Antonelli, Stewart & Hill

[57] ABSTRACT

Improvement in equipment used for making a telephone connection comprising a path on conductors and a radio path, such equipment being made less sensitive to parasitic disturbances due to a great reduction in the band required for transmitting a control signal supplied by an envelope detector and a syllabic detector.

16 Claims, 1 Drawing Figure

PATENTED JAN 16 1973 3,711,647
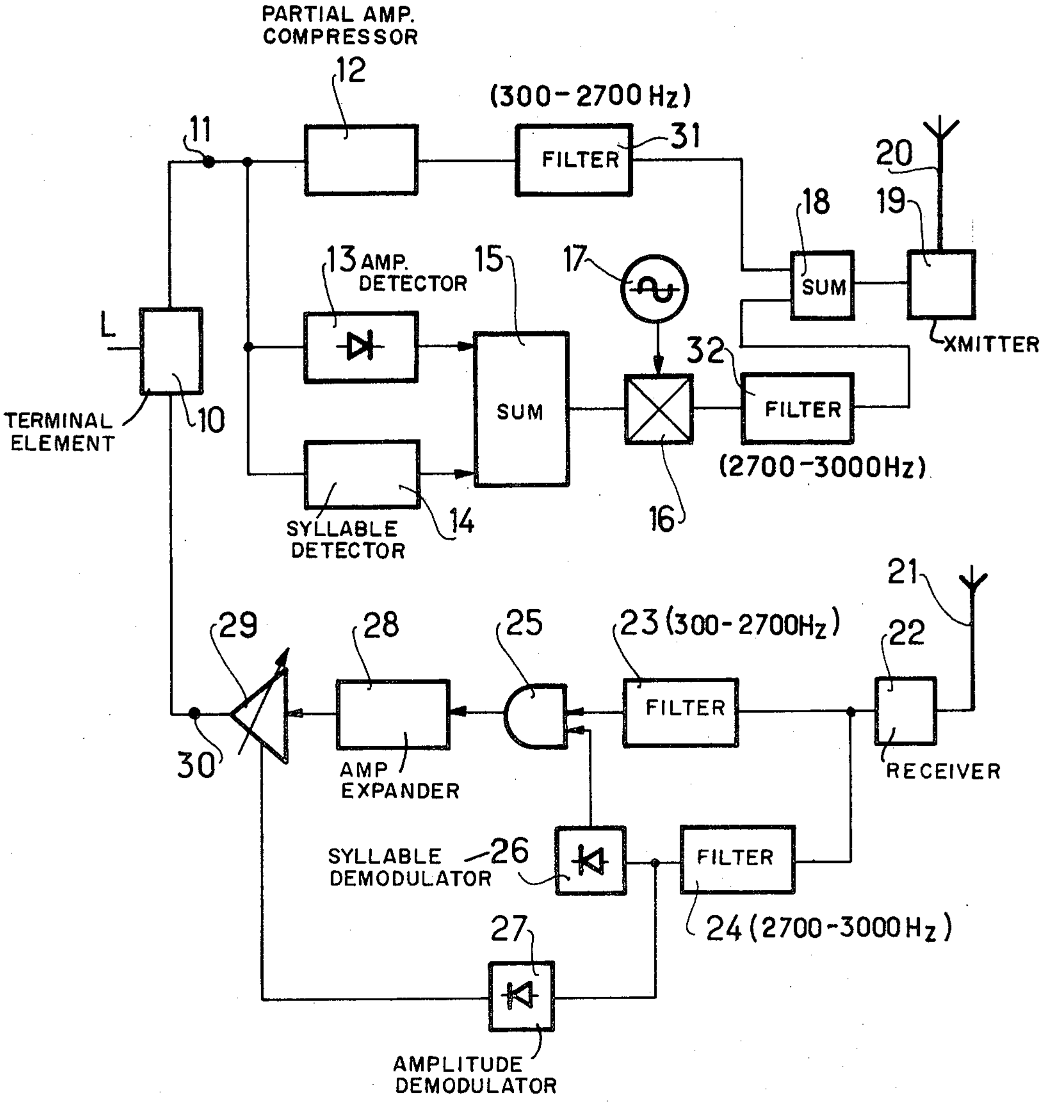
INVENTOR
MARCEL-LOUIS BOYER
BY Craig, Antonelli, Stewart & Hill
ATTORNEYS

CIRCUIT FOR INTERCONNECTION OF TELEPHONE AND RADIO-TELEPHONE NETWORKS

The present invention concerns equipment providing a telecommunication liaison, particularly but not exclusively, a telephone liaison, partly over wires and partly by radio transmission.

The invention is intended to provide an improvement in such equipment rendering it less sensitive to disturbances caused by interference signals, this being obtained by a significant reduction in the band employed for control signals. An important application is to the interconnection of a wired telephone network and a radio-telephone network.

In such a communication, two sets of network connection circuitry, each including a transmitter and cooperating receiver, provide the liaison. As this arrangement constitutes a closed loop, it is necessary to take steps to avoid oscillation and to ensure stability.

In previously proposed network connection circuitry, a transmitter assembly provides two channels. In a first or "frequency" channel the voice-frequency signals for transmission are strongly compressed to a constant amplitude. Thus, this channel gives only information significant of the instantaneous frequency, all amplitude information being suppressed. This band may cover, for example, the range 300–2,700 Hz.

A second or "amplitude" channel provides information extracted from the measurement of the instantaneous amplitude of the received signal. This varies much more slowly than the frequency information. The information provided by the second channel is transmitted, for example, by frequency modulation of a sub-carrier frequency in the band 2,700–3,000 Hz. This transmission of such an amplitude signal requires a band width of the order of 120 Hz. The combination of two channels provides the transmitted signal.

In this proposed system, the receiver assembly is symmetrically constructed. It has a frequency channel with band width 300–2,700 Hz, and includes an expander whose instantaneous expansion factor is controlled by a signal demodulated at the output of a decoded amplitude channel.

Stability is obtained because, for zero transmission amplitude, when the subscriber concerned is listening, the amplitude channel of the transmitter, which has zero gain in these conditions, blocks transmission. Likewise, when a subscriber speaks and does not receive, his receiver is blocked by the zero reception level. Satisfactory stability is thus obtained.

However, the quality of reception may be seriously disturbed because, in the pass band of some 120 Hz band width of the amplitude channel, interference signals may be present which, received by the expander, are treated by this latter exactly as a useful amplitude signal. Distortions may result from this and render the signal completely unintelligible.

In accordance with the present invention, network connection circuitry providing interconnection of a wired telephone network and a radio-telephone network includes output circuitry connected to receive voice frequency signals to be transmitted and to apply those signals simultaneously to respective inputs of a partial amplitude compressor providing at its output a non-zero dynamic range, a narrow band transmission amplitude detector, and a syllable detector arranged to provide a pulse at the beginning of each syllable in the voice signals.

Using the invention it is possible to reduce the effect of interference signals in replacing the amplitude channel of the previously proposed equipment by a control channel which is more complex but narrower, in combination with a wide transmitted band and using only a partial compression.

The invention will now be described in more detail, by way of example only, with reference to the accompanying diagrammatic drawing in which the single FIGURE is a block diagram of network connection circuitry.

Referring to the FIGURE, the network connection circuitry is connected to a telephone subscriber line L through a termination element 10. The element 10 has an output terminal 11 and an input terminal 30.

Connected to terminal 11 is the input of the partial amplitude compressor 12. This has an output frequency range of 300–2,700 Hz, and provides at its output a version of its input signal which has been partially compressed, that is to say whose amplitude is not vigorously constant but has a residual dynamic range, for example of the order of 10 dB. The compressor output is connected to the input of a band-pass filter 31 whose frequency range is 300–2,700 Hz.

Terminal 11 is also connected to the input of an amplitude detector 13 with a very narrow pass band extending from zero frequency to approximately 2 Hz. This detector may consist of a conventional detector circuit to which is added an RC time constant circuit in which the large value of capacitance C required is provided by an active electronic circuit, well known to those skilled in the art, such as an integrator for example.

The terminal 11 is also connected to the input of a syllable detector 14 whose construction will be well known to those skilled in the art and will not described in detail here. The syllable detector is connected to receive a range of acoustic frequencies and is arranged to detect therein the beginning of a syllable of human language. A syllable is then characterized by its frequency range, its level and its duration. The detector may consist, for example, of a band-pass filter of range 300–2,700 Hz in series with an envelope detector and a band-pass filter whose band width is 2–40 Hz.

The output of detectors 13 and 14 are applied to and combined in summation circuitry 15. The combined signal is applied to a frequency modulator 16 receiving a sub-carrier frequency from a generator 17. The modulator output passes through a band-pass filter 32 whose band extends from 2,700–3,000 Hz.

The outputs of filters 31 and 32 are applied to and combined in further summation circuitry 18, the combined signals being applied to a transmitter 19 and broadcast over an aerial 20.

The circuitry so far described constitutes the transmission side of the network connection circuitry.

The reception side has an aerial 21 connected to a receiver 22. The output of receiver 22 is supplied to respective inputs of two band-pass filters 23 and 24 with respective band widths 200–2,700 Hz and 2,700–3,000 Hz.

The output of filter 23 is connected to one input of an AND-gate 25 whose output is connected to the input of an amplitude expander 28. The output of the expander 28 is applied to the input of the variable gain amplifier 29.

The output of filter 24 is connected to a syllable test demodulator 26 with a pass band extending from 2–40 Hz. Its output signal is applied to the second input of the AND-gate 25.

The output of filter 24 is also connected to the input of an amplitude demodulator 27 whose band width extends from 0–2 Hz. This demodulator is analogous to the transmission amplitude detector 13 of the transmission side of the circuitry. The output signal of the amplitude demodulator 27 is applied to a gain control input of the amplifier 29.

The reconstituted low frequency signal appearing at the output of the amplifier 29 is applied to terminal 30 of the termination element 10, thus passing to the line L.

Because the compressor 12 only partially compresses the input signal, leaving in the signal a certain amount of amplitude information, the amplitude detector 13 can have a transmitted band much narrower than those of the previously proposed equipment, moreso as the syllable rhythm is transmitted by the syllable detector arrangement.

It is sufficient for the amplitude detector 13 to have a band width of some few Hertz, for example 0–2 Hz, and for the syllable detector 14 to have a band width of some few dozens of Hertz, for example 2–40 Hz. Thus, the total band width is 40 Hz, a substantial reduction in comparison with the previously proposed equipment mentioned above in which the corresponding band width is 120 Hz.

It will be appreciated that the mean amplitude signal provided by the amplitude detector 13 and having a maximum frequency of 2 Hz may be transmitted by frequency modulation in the frequency band 2,700 to 3,000 Hz, providing a very high modulation index advantageous for protection against noise and interference.

If, on the transmission side, the modulator 16 is a frequency modulator, the receiver side will be provided, at the output of the filter 24, with a frequency demodulator followed by a low-pass filter with range 0–2 Hz, replacing the detector 26. A band-pass filter with range 2–40 Hz. would replace the detector 27.

On the reception side, the AND-gate 25 provides wide band signals to the expander 28 only when opened by the output of the syllable test demodulator 26. Otherwise the reception channel is interrupted.

While I have shown and described one embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

What is claimed is:

1. Network connection circuitry for providing interconnection of a wired telephone network and a radiotelephone network, comprising termination circuit means connected to receive voice frequency signals to be transmitted;

a partial amplitude compressor providing at its output a non-zero dynamic range, a narrow band transmission amplitude detector, and a syllable detector arranged to provide a pulse at the beginning of each syllable in a voice signal, said signal termination circuit means being connected to simultaneously apply said voice frequency signals to respective inputs of said partial amplitude compressor, said amplitude detector and said syllable detector; and output circuit means for transmitting a summation of the outputs of said partial amplitude compressor, said amplitude detector and said syllable detector.

2. Circuitry as defined in claim 1, wherein said partial amplitude compressor has an output dynamic range substantially equal to 10 decibels.

3. Circuitry as defined in claim 1, wherein said narrow band transmission amplitude detector has a band width extending from 0–2 Hertz.

4. Circuitry as defined in claim 1, wherein said output circuit means includes summation circuit means for combining the outputs of said transmission amplitude detector and said syllable detector, a modulator connected to the output of said summation circuit means and to means generating a sub-carrier frequency located at the upper end of the voice frequency band, further summation circuit means for combining the output of said modulator and the output of said partial amplitude compressor, and a radio-telephone transmitter connected to the output of said further summation circuit means.

5. Circuitry as defined in claim 4, wherein said partial amplitude compressor has an output dynamic range substantially equal to 10 decibels.

6. Circuitry as defined in claim 5, wherein said narrow band transmission amplitude detector has a band width extending from 0–2 Hertz.

7. Network connection circuitry for providing interconnection of a wired telephone network and a radiotelephone network, comprising termination circuit means connected to receive voice frequency signals to be transmitted;

a radio-telephone transmitter including a partial amplitude compressor providing at its output a non-zero dynamic range, a narrow band transmission amplitude detector, and a syllable detector arranged to provide a pulse at the beginning of each syllable in a voice signal, said termination circuit means being connected to simultaneously apply said voice frequency signals to respective inputs of said partial amplitude compressor, said amplitude detector and said syllable detector, and output circuit means for transmitting a summation of the outputs of said partial amplitude compressor, said amplitude detector and said syllable detector; and a radio-telephone receiver connected to said termination circuit means.

8. Circuitry as defined in claim 7, wherein said output circuit means includes summation circuit means for combining the outputs of said transmission amplitude detector and said syllable detector, a modulator connected to the output of said summation circuit means and to means generating a sub-carrier frequency located at the upper end of the voice frequency band, further summation circuit means for combining the output of said modulator and the output of said partial amplitude compressor, and a radio-telephone transmitter connected to the output of said further summation circuit means.

9. Circuitry as defined in claim 8, wherein said radiotelephone receiver includes a receiver, a first filter connected to the output of said receiver, a second filter connected to the output of said receiver, a narrow band amplitude demodulator connected to the output of said second filter, a syllable test demodulator connected to the output of said second filter, and circuit means for generating voice frequency signals in response to the outputs of said syllable test demodulator, said first filter and said amplitude demodulator.

10. Circuitry as defined in claim 9, wherein said first filter is a band-pass filter having a band width of 300–2,700 Hertz.

11. Circuitry as defined in claim 9, wherein said second filter is a band-pass filter having a band width of 2,700–3,000 Hertz.

12. Circuitry as defined in claim 9, wherein said narrow band amplitude demodulator has a band width of 0–2 Hertz.

13. Circuitry as defined in claim 7, wherein said circuit means for generating voice frequency signals includes an AND-gate having one input connected to the output of said first filter and a second input connected to the output of said syllable test demodulator, an amplitude expander connected to the output of said AND-gate and a variable gain amplifier connected to the output of said expander, the output of said amplitude demodulator being connected to said variable gain amplifier to vary the gain thereof.

14. Circuitry as defined in claim 13, wherein said first filter is a band-pass filter having a band width of 300–2,700 Hertz.

15. Circuitry as defined in claim 14, wherein said second filter is a band-pass filter having a band width of 2,700–3,000 Hertz.

16. Circuitry as defined in claim 15, wherein said narrow band amplitude demodulator has a band width of 0–2Hertz.

* * * * *